United States Patent [19]

Kojima

[11] 4,161,447
[45] Jul. 17, 1979

[54] PROCESS FOR TREATING WASTE WATER CONTAINING RADIOACTIVE SUBSTANCES

[75] Inventor: Katumi Kojima, Ohimachi, Japan

[73] Assignees: Daicel Ltd., Osaka; Mitsui Shipbuilding & Engineering Co., Ltd., Tokyo, both of Japan

[21] Appl. No.: 524,976

[22] Filed: Nov. 18, 1974

[30] Foreign Application Priority Data

Jun. 13, 1974 [JP] Japan .................. 49-67520

[51] Int. Cl.² ........................... B01D 13/00
[52] U.S. Cl. ................................ 210/23 H
[58] Field of Search ............ 210/22, 23, 321, 259

[56] References Cited

U.S. PATENT DOCUMENTS

| | | | |
|---|---|---|---|
| 3,228,877 | 1/1966 | Mahon | 210/22 |
| 3,291,730 | 12/1966 | Martin | 210/22 |
| 3,310,488 | 3/1967 | Loeb et al. | 210/22 |
| 3,423,491 | 1/1969 | McLain et al. | 210/500 X |
| 3,519,558 | 7/1970 | Cooper et al. | 210/23 |
| 3,620,970 | 11/1971 | Klug et al. | 210/500 X |
| 3,721,623 | 3/1973 | Stana | 210/500 X |
| 3,804,754 | 4/1974 | Ishii et al. | 210/23 |
| 3,839,206 | 10/1974 | Welch | 210/259 |

Primary Examiner—Frank A. Spear, Jr.
Attorney, Agent, or Firm—Blanchard, Flynn, Thiel, Boutell & Tanis

[57] ABSTRACT

A process for treating waste water containing radioactive substances comprising treating the waste water by reverse osmosis in the presence of at least one organic surfactant selected from the group consisting of anionic surfactants, cationic surfactants and nonionic surfactants.

8 Claims, 3 Drawing Figures

PROCESS FOR TREATING WASTE WATER CONTAINING RADIOACTIVE SUBSTANCES

BACKGROUND OF THE INVENTION

1. Field of the Invention

This invention relates to a process for treating waste water containing radioactive substances, in which the waste water containing radioactive substances is subjected to reverse osmosis ultrafiltration in the presence of surfactant(s).

2. Description of the Prior Art

Waste waters containing radioactive substances which are discharged from various atomic energy installations wherein radioactive substances are used or produced, pose unique and serious problems of environmental pollution. Therefore, improved processes for treating such waste waters safely are urgently needed.

For treating waste waters containing radioactive substances, there have been developed various processes such as evaporation processes, ion exchange processes, electrodialysis processes and aggregation precipitation processes. However, those processes are all unsatisfactory. Recently, the treatment of such waste waters by the reverse osmotic membrane process has attracted attention. However, even by this process as heretofore practiced, radioactive substances cannot be removed sufficiently from the waste waters.

SUMMARY OF THE INVENTION

It has been discovered, unexpectedly in view of the prior art, that the proportion of the radioactive substances removed by the treatment employing the reverse osmotic membrane device can be increased remarkably by effecting the treatment in the presence of a surfactant.

This invention provides a process for treating waste waters containing one or more radioactive substances, in which waste water containing radioactive substances is treated with a reverse osmotic membrane device in the presence of at least one organic surfactant selected from the group consisting of anionic surfactants, cationic surfactants and nonionic surfactants, in an amount in the range of from 0.1 to 1.0 weight percent effective to remove more than 99 weight percent of the radioactive substances.

The amount of the surfactant employed in the process of the invention is significant, because it has a close relation to the improved effect achieved by the present invention.

A test was carried out on the relationship between the concentration of sodium dodecylbenzenesulfonate (surfactant) and the ratio of removal of radioactive substances ($^{60}Co$, $^{144}Ce$) (represented by decontamination factor) in the treatment of waste waters containing radioactive substances by the reverse osmotic membrane process. The results obtained are shown in FIG. 1.

The term "decontamination factor" is determined by the following formula $$\frac{\text{concentration of radioactive substances in the incoming water}}{\text{concentration of radioactive substances in the outgoing water}}$$

Figure 1:
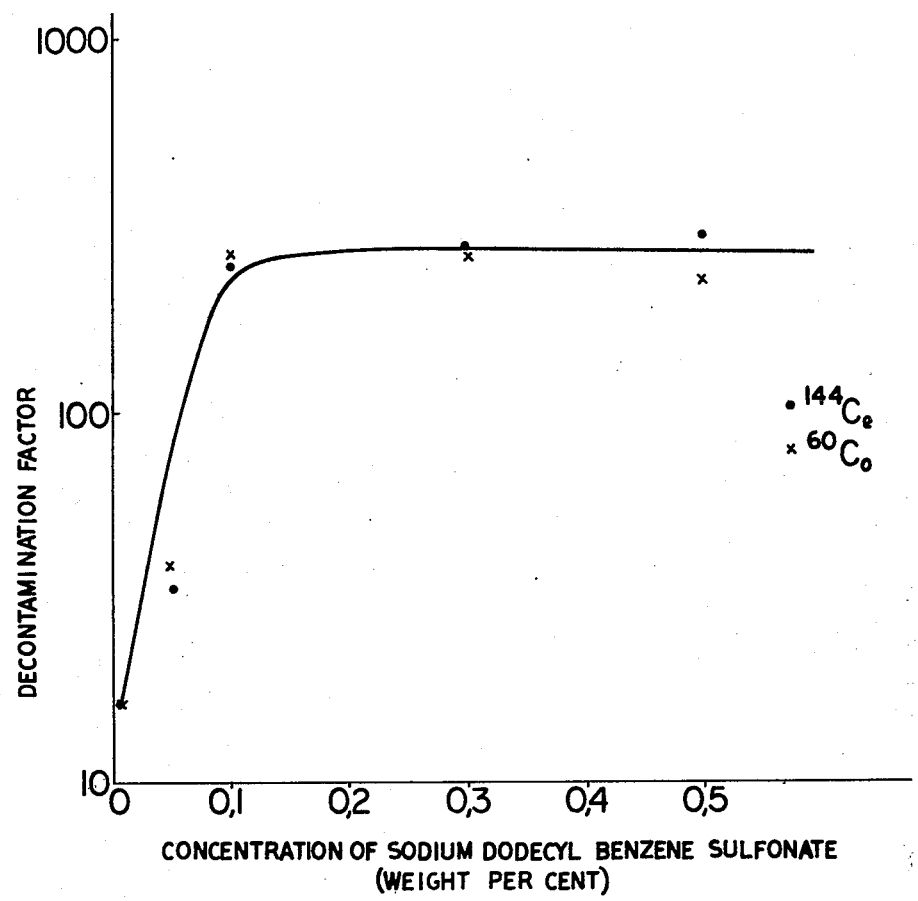
FIG. 1 is a graph showing the relationship between the concentration of surfactant and the decontamination factor achieved by reverse osmosis ultrafiltration, according to the invention.

The results of FIG. 1 clearly show that the decontamination factor of the radioactive substances is increased as the concentration of the surfactant in the waste water is increased. Particularly, it is noted that the decontamination factor is improved remarkably when the concentration of the surfactant (sodium dodecylbenzenesulfonate) is at least about 0.1 weight percent, based on the waste water treated, and that at a concentration of above about 0.1 weight percent, the decontamination factor remains substantially constant.

The critical concentration of micelle formation of sodium dodecylbenzene sulfonate is 1.4 m.mol/l. [refer to p. 698 of "Yushi Kagaku Binran" edited by Nihon Yukagaku Kyokai and published by Maruzan Co. (1971)]. This critical concentration corresponds to a concentration of 0.05 weight percent.

It was supposed that the critical concentration of micelle formation of the surfactant is related to the removal of radioactive substances according to the reverse osmotic membrane process of the present invention, because it had been generally considered that the surface activity of surfactants is more or less constant at a concentration above the critical concentration of micelle formation. However, it has been found, surprisingly, that the effect of removing radioactive substances reaches a substantial maximum at a concentration which is twice as high as the critical concentration of micelle formation, i.e., at 0.1 percent. This fact is unexpected in view of the ordinary knowledges of surfactants in this technical field.

Thus, in the treatment of waste waters containing radioactive substances by means of a reverse osmotic membrane device in the presence of a surfactant, it is preferred to adjust the concentration of the surfactant to a value above the critical concentration of micelle formation, particularly, to a value more than twice as high as the critical concentration of micelle formation.

As the surfactants employed in the present invention, there can be used any cationic, anionic and nonionic organic surfactants. As examples of suitable cationic surfactants, there can be mentioned higher amine haloacid salts, quaternary ammonium salts, alkylpyridinium halides, etc. As examples of suitable anionic surfactants, there can be mentioned alkylarylsulfonic acid salts, alkylsulfonic acid salts, alkylsulfuric acid salts, alkali salts of higher fatty acids, sulfosuccinic acid ester salts, etc. for example, alkylbenzenesulfonates in which the alkyl has from 8 to 18 carbon atoms, alkyl-sulfonates in which the alkyl has from 10 to 20 carbon atoms, α-olefin sulfonates having 13 to 20 carbon atoms, alkyl sulfates in which the alkyl has 8 to 18 carbon atoms, alkali metal salts of high fatty acids, rosin acid or tall oil, and sulfosuccinic acid ester salts in which the ester group has 4 to 10 carbon atoms. As examples of nonionic surfactants, there can be mentioned polyoxyethylene alkyl ethers, polyoxyethylene fatty acid esters, sorbitan fatty acid esters, fatty acid monoglycerides, etc. for example, ethoxylated aliphatic alcohols in which the aliphatic group is from 8 to 18 carbon atoms and the moles of ethylene oxide per mole of aliphatic hydrophobe is from 5 to 30, ethoxylated alkyl phenols in which the alkyl group is from 8 to 18 carbon atoms and the moles of ethylene oxide per mole of alkyl hydrophobe is from 1.5 to 30, glycerol esters of fatty acids of from 8 to 18 carbon atoms, and esters of sorbitan with aliphatic acids of from 8 to 18 carbon atoms. Further, amphoteric surfactants such as amino acids can be used for example, an amino carboxyl surfactant or an amino sulfuric acid ester surfactant. These general classes of surfactants are well known.

As examples of commercially available materials containing radioactive substances which are discharged from atomic energy installations wherein radioactive substances are used or produced, there can be mentioned various waste waters such as the cooling water discharged from a nuclear reactor.

Another example of such waste waters is synthetic detergent-containing water discharged from an atomic energy installation wherein radioactive substances are used or produced and wherein a composition containing a chelating agent mainly comprising a synthetic detergent is incorporated for decontamination of equipment parts to establish safety.

The process of this invention can be applied to all waste waters containing radioactive substances. For example, to the cooling water discharged from a nuclear reactor there is added a surfactant in an amount such that the concentration thereof in the water is controlled to a desired value, as described above, and then the water is subjected to reverse osmosis using a conventional semipermeable membrane device.

As another example, a waste water containing both radioactive substances and a synthetic detergent is first adjusted so as to have a desired concentration of surfactant by adding a surfactant or by dilution with water, and then it is treated with the reverse osmotic device.

The process of the present invention is particularly effective for the treatment of waste waters containing both radioactive substances and a detergent which is discharged after being used for washing equipment parts contaminated with radioactive substances.

If waste water containing both radioactive substances and a detergent is treated according to a conventional process for treating waste waters containing radioactive substances such as the evaporation process, the ion exchange process, the electrodialysis process or the aggregation precipitation process, the treatment is difficult due to foaming property of the surfactant contained in the waste water. When a chelating agent is contained in the waste waters, processes other than the evaporation process cannot be employed easily.

The waste waters containing both radioactive substances and surfactants in a more highly concentrated state than the starting waste water, which are obtained as the effluent from the inlet side of the membrane according to the present invention can be discharged after a treatment by known processes.

Further, the purified water obtained as the effluent from the outlet side of the membrane in the process of the present invention can be treated further by known processes, if desired or necessary.

The reverse osmosis membranes used in the present invention are those conventionally employed for water purification. There can be mentioned, for example, cellulose acetate membranes.

As to the physical form of the reverse osmotic membrane device, any of the plate type, the tubular type, the coiled roll type or the hollow filament type can be used.

The invention will be further described by reference to the following illustrative examples.

Figure 2:
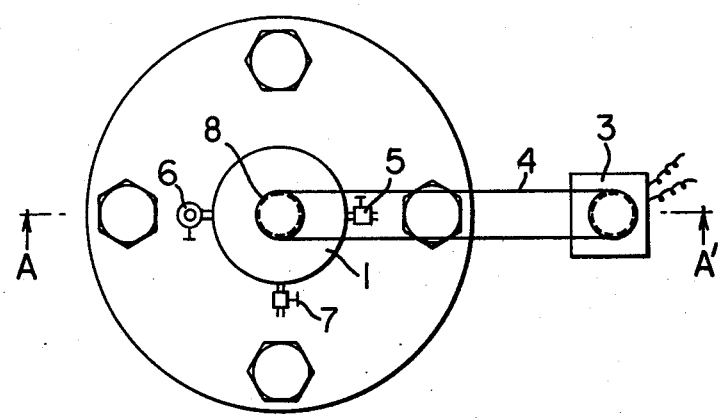
FIG. 2 is a top view of a reverse osmosis test device.
Figure 3:
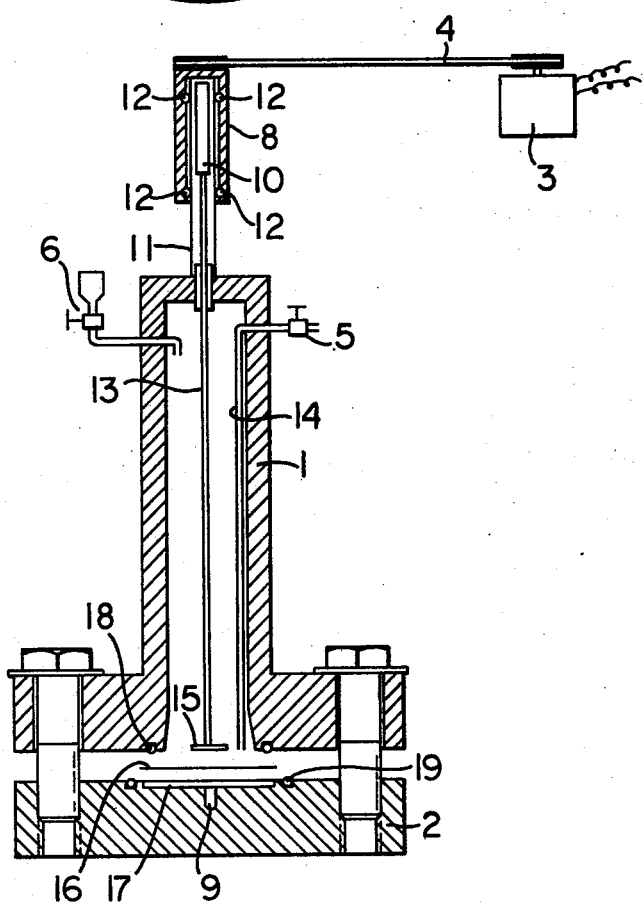
FIG. 3 is a sectional view taken along line A—A of FIG. 2.

The effects of the process of the present invention were determined with a reverse osmotic test device as illustrated in FIGS. 2 and 3.

The device has an upper cell body 1 and a lower cell body 2 which are joined with each other by bolts. These bodies are shown partially disassembled in FIG. 3, but it will be understood that during a test they are in abutting fluid-tight relationship. A semipermeable membrane 16 is placed between the upper cell body 1 and the lower cell body 2. The liquid to be treated (raw liquid fed in) is separated and sealed from the treated liquid that passes through the membrane 16 by means of O-rings 18 and 19. An external rotary magnet 8 is rotated by a stirring motor 3 and a belt 4, thereby to rotate an internal rotary magnet 10 disposed in a pressure-resistant cap 11. A stirring blade 15 is rotated through a shaft 13 which is coupled to the internal rotary magnet 10. 5 is a valve connected with a pipe 14. 6 is a valve for feeding the feed liquid to be treated. 7 is a valve for introducing high pressure nitrogen gas for increasing the pressure in the cell body 1. 9 is an outlet for the treated liquid. 12 is a bearing. 17 is a porous plate.

In operation, the liquid to be treated (raw liquid fed in) is charged into the cell body 1 through the valve 6 while the valves 5 and 7 are open to the ambient atmosphere. Stirring of the feed liquid is effected at a predetermined speed of rotation. The valves 5 and 6 are then closed. The valve 7 is then connected with the high pressure nitrogen system. The reverse osmosis test is effected by increasing the pressure on the feed liquid by means of nitrogen gas. The treated liquid (liquid which has passed through the membrane 16) then passes through the porous plate 17 and taken out for sampling through the outlet 9. After completion of the test, the liquid remaining in the cell 1 is taken out from the system under the nitrogen gas pressure by passing through the pipe 14 and the valve 5.

EXAMPLE 1

Solutions each containing 0.5 weight percent, 0.1 weight percent, 0.05 weight percent and 0 weight percent of sodium dodecylbenzenesulfonate and also containing $1.2 \times 10^{-1}$ $\mu$Ci/ml. of $^{60}$Co and $1.2 \times 10^{-1}$ $\mu$Ci/ml. of $^{144}$Ce as radioactive nuclides were used as the liquids to be treated (raw liquids fed in). Reverse osmosis treatment was effected by using the reverse osmosis test device as shown in FIGS. 2 and 3. The test conditions were pH=6, stirring speed=500 r.p.m., nitrogen pressure=40 Kg/cm$^2$ and temperature=20±1° C. The radioactivities of the samples of the treated liquid were measured with a $\gamma$-ray pulse height analyzer. The decontamination factors of the radioactive nuclides were determined according to the following equation to obtain the results which are shown in Table I below:

$$\text{Decontamination factor} = \frac{\text{Radioactivity concentration of the liquid to be treated (raw liquid fed in) } (\mu\text{Ci/ml.})}{\text{Radioactivity concentration of the treated liquid (liquid which passed through the membrane) } (\mu\text{Ci/ml.})}$$

Table 1

| Concentration of sodium dodecylbenzene-sulfonate | $^{60}Co$ Decontamination factor | $^{144}Ce$ Decontamination factor |
| --- | --- | --- |
| 0% | $1.6 \times 10$ | $1.6 \times 10$ |
| 0.05% | $3.2 \times 10$ | $3.6 \times 10$ |
| 0.1% | $2.4 \times 10^2$ | $2.6 \times 10^2$ |
| 0.5% | $2.9 \times 10^2$ | $2.2 \times 10^2$ |

It will be understood from this example that the decontamination factor of the radioactive nuclides is maintained substantially constant at a sodium dodecylbenzenesulfonate concentration of above 0.1 percent, i.e., at a concentration more than 2 times as high as the critical concentration of micelle formation (0.05 percent)

EXAMPLE 2

Aqueous solution each containing 0.5 weight percent of sodium dodecylbenzenesulfonate, sodium dodecylsulfate and an alkyl (C12) trimethyl ammonium chloride and also containing $1.2 \times 10^{-1}$ µCi/ml. of $^{60}Co$ and $1.2 \times 10^{-1}$ µCi/ml. of $^{144}Ce$ in the same manner as in Example 1 were used as the liquids to be treated. Reverse osmosis test was effected under the same conditions as in Example 1. The following results were obtained:

Table II

| Surfactant | $^{60}Co$ decontamination factor | $^{144}Ce$ decontamination factor |
| --- | --- | --- |
| none | $1.6 \times 10$ | $1.6 \times 10$ |
| Sodium dodecylbenzenesulfonate | $2.9 \times 10^2$ | $2.2 \times 10^2$ |
| Sodium dodecylsulfate | $3.0 \times 10^2$ | $2.4 \times 10^2$ |
| Alkyltrimethylammonium chloride | $2.0 \times 10^2$ | $1.1 \times 10^2$ |

It is understood from this example that all of the above surfactants are effective for the removal of the radioactive nuclides.

The embodiments of the invention in which an exclusive property or privilege is claimed are defined as follows:

1. In a reverse osmosis process for purifying waste water from atomic energy installations containing radioactive substances, in which the waste water is flowed under pressure in contact with a semipermeable membrane and the radioactive substances are preferentially retained on one side of the membrane and purified water is recovered from the other side of the membrane, the improvement which comprises said waste water flowed past said membrane contains from 0.1 to 1.0 weight percent of at least one water-soluble organic surfactant effective to retain more than about 99 percent of the radioactive substances in said waste water on said one side of said membrane, and wherein the concentration of said organic surfactant in said waste water is at least twice as much as the critical concentration of micelle formation of said surfactant in said waste water.

2. A reverse osmosis process as claimed in claim 1, in which said organic surfactant is selected from the group consisting of anionic, cationic, nonionic and amphoteric surfactants.

3. A reverse osmosis process as claimed in claim 1, in which said organic surfactant is a cationic surfactant selected from the group consisting of amine salt-type surfactants, quaternary ammonium salt-type surfactants and pyridinium salt-type surfactants.

4. A reverse osmosis process as claimed in claim 1, in which said organic surfactant is an anionic surfactant selected from the group consisting of alkylbenzenesulfonates in which the alkyl has from 8 to 18 carbon atoms, alkylsulfonates in which the alkyl has from 10 to 20 carbon atoms, α-olefin sulfonates having 13 to 20 carbon atoms, alkyl sulfates in which the alkyl has 8 to 18 carbon atoms, alkali metal salts of high fatty acids, rosin acid or tall oil, and sulfosuccinic acid ester salts in which the ester group has 4 to 10 carbon atoms.

5. A reverse osmosis process as claimed in claim 1, in which said organic surfactant is a nonionic surfactant selected from the group consisting of ethoxylated aliphatic alcohols in which the aliphatic group is from 8 to 18 carbon atoms and the moles of ethylene oxide per mole of aliphatic hydrophobe is from 5 to 30, ethoxylated alkyl phenols in which the alkyl group is from 8 to 18 carbon atoms and the moles of ethylene oxide per mole of alkyl hydrophobe is from 1.5 to 30, glycerol esters of fatty acids of from 8 to 18 carbon atoms, and esters of sorbitan with aliphatic acids of from 8 to 18 carbon atoms.

6. A reverse osmosis process as claimed in claim 1, in which said organic surfactant is an amino carboxyl surfactant or an amino sulfuric acid ester surfactant.

7. A reverse osmosis process as claimed in claim 1, in which said organic surfactant is sodium dodecylbenzenesulfonate.

8. A reverse osmosis process as claimed in claim 1, in which said surfactant is selected from the group consisting of sodium dodecylbenzenesulfonate, sodium dodecylsulfate and alkyl (C12) trimethyl ammonium chloride.

* * * * *